US006113830A

United States Patent [19]
Chen et al.

[11] Patent Number: 6,113,830
[45] Date of Patent: Sep. 5, 2000

[54] COATED FUSER MEMBER AND METHODS OF MAKING COATED FUSER MEMBERS

[75] Inventors: Jiann H. Chen, Fairport; Richard J. Kosakowski, Rochester; Gary F. Roberts, Macedon; Roger H. Calendine, Pittsford, all of N.Y.

[73] Assignee: Eastman Kodak Company, Rochester, N.Y.

[21] Appl. No.: 09/123,126

[22] Filed: Jul. 27, 1998

Related U.S. Application Data

[62] Division of application No. 08/729,972, Oct. 15, 1996.

[51] Int. Cl.[7] .............................. B05D 1/06; B29C 43/02

[52] U.S. Cl. .......................... 264/241; 264/259; 264/319; 264/320; 264/126; 427/475; 427/485; 427/409

[58] Field of Search .................................... 427/470, 475, 427/485, 486, 409; 264/241, 260, 126, 319, 320, 259

[56] References Cited

U.S. PATENT DOCUMENTS

| | | | |
|---|---|---|---|
| Re. 33,770 | 12/1991 | Torino et al. | 355/290 |
| 2,612,484 | 9/1952 | Bankoff | 260/29.6 |
| 3,435,500 | 4/1969 | Aser et al. | 29/130 |
| 3,912,901 | 10/1975 | Strella et al. | 219/216 |
| 4,087,394 | 5/1978 | Concannon | 260/29.6 F |
| 4,139,576 | 2/1979 | Yoshimura et al. | 260/857 |
| 4,196,256 | 4/1980 | Eddy et al. | 428/422 |
| 4,199,626 | 4/1980 | Stryjewski et al. | 427/444 |
| 4,209,550 | 6/1980 | Hagenbach et al. | 427/486 |
| 4,272,179 | 6/1981 | Seanor | 355/3 FU |
| 4,375,505 | 3/1983 | Newkirk . | |
| 4,567,349 | 1/1986 | Henry et al. | 219/216 |
| 4,789,565 | 12/1988 | Kon et al. | 427/375 |
| 4,804,576 | 2/1989 | Kuge et al. | 428/216 |
| 4,819,020 | 4/1989 | Matsushsiro et al. | 355/14 FU |
| 4,842,944 | 6/1989 | Kuge et al. | 428/451 |
| 4,853,737 | 8/1989 | Hartley et al. | 355/289 |
| 4,883,715 | 11/1989 | Kuge et al. | 428/421 |
| 4,910,559 | 3/1990 | Kuge et al. | 428/421 |
| 4,914,146 | 4/1990 | Honda | 524/449 |
| 4,950,538 | 8/1990 | Honda et al. | 428/35.7 |
| 4,976,046 | 12/1990 | Suzuki et al. | 355/3 FR |
| 5,011,401 | 4/1991 | Sakurai et al. | 432/60 |
| 5,045,891 | 9/1991 | Senba et al. | 355/289 |
| 5,123,151 | 6/1992 | Uehara et al. | 29/130 |
| 5,133,998 | 7/1992 | Okazaki et al. | 427/428 |
| 5,153,660 | 10/1992 | Goto | 355/290 |
| 5,177,552 | 1/1993 | Isogai et al. | 355/285 |
| 5,187,849 | 2/1993 | Kobayashi | 29/492 |
| 5,217,837 | 6/1993 | Henry et al. | 430/124 |
| 5,253,027 | 10/1993 | Goto | 355/290 |
| 5,468,531 | 11/1995 | Kikukawa et al. | 428/36.5 |
| 5,546,175 | 8/1996 | Uehara et al. | 355/290 |
| 5,547,749 | 8/1996 | Chen et al. | 428/421 |
| 5,547,759 | 8/1996 | Chen et al. | 428/421 |
| 5,592,275 | 1/1997 | Echigo et al. | 399/325 |

FOREIGN PATENT DOCUMENTS

| | | |
|---|---|---|
| 321162 | 6/1989 | European Pat. Off. . |
| 322127 | 6/1989 | European Pat. Off. . |
| 48370-A | 10/1990 | European Pat. Off. . |
| 513822 | 11/1992 | European Pat. Off. . |
| 5 7089-785 | 11/1980 | Japan . |
| 5 8024-174 | 8/1981 | Japan . |
| 5 9000-174 | 5/1984 | Japan . |
| 6 3004-283A | 6/1986 | Japan . |
| 6 3004-284A | 6/1986 | Japan . |
| 6 3004-286 | 6/1986 | Japan . |
| 6 3004-287 | 6/1986 | Japan . |
| 6 3004285 | 6/1986 | Japan . |
| 61124974 | 6/1986 | Japan . |
| 6 3027-873 | 7/1986 | Japan . |
| 1219-875 | 2/1988 | Japan . |
| 3038-334 | 7/1989 | Japan . |

OTHER PUBLICATIONS

US Patent Application Serial No. 08/122,754 filed Sep. 16, 1993 (now USP 5,582,917, issued Dec. 10, 1996—copy not yet available), a continuation of US Ser.No. 07/940,929, filed Sep. 4, 1992.

*Encyclopedia of Polymer Science and Engineering,* Polytetrafluoroethylene, homopolymer of tetrafluoroethylene, vol. 16, 2nd Ed, pp. 577–599 (John Wiley & Sons) (1989).

*Encyclopedia of Chemical Technology,* Powder Coatings, vol. 19, pp. 1–25 (John Wiley & Sons) (1982).

K.Batzar, *Principles of Fluoropolymer Coatings to Substrates,* pp. 463–471, No date.

*Primary Examiner*—Fred J. Parker
*Attorney, Agent, or Firm*—Doreen M. Wells

[57] ABSTRACT

Coated fuser members such as a fuser roller, pressure roller, or fuser belt, and the method of making the coated fuser members are disclosed. The release coating comprises an outermost layer of fluoropolymer resin uniquely bonded to a fluoroelastomer layer.

9 Claims, No Drawings

COATED FUSER MEMBER AND METHODS OF MAKING COATED FUSER MEMBERS

CROSS REFERENCE TO RELATED APPLICATION

This is a Divisional of application Ser. No. 08/729,972, filed Oct. 15, 1996.

FIELD OF THE INVENTION

This invention relates to electrostatographic apparatus and coated fuser members and methods of making coated fuser members. More particularly, this invention relates to an improved multi-layer coating for fuser members and the method of making the multi-layer coated fuser members.

BACKGROUND OF THE INVENTION

Known to the electrostatographic fixing art are various fuser members adapted to apply heat and pressure to a heat-softenable electrostatographic toner on a receiver, such as paper, to permanently fuse the toner to the receiver. Examples of fuser members include fuser rollers, pressure rollers, fuser plates and fuser belts for use in fuser systems such as fuser roller systems, fuser plate systems and fuser belt systems.

One of the long-standing problems with electrostatographic fusing systems is the adhesion of the heat-softened toner particles to the surface of a fuser member and not to the receiver, known as offset, which occurs when the toner-bearing receiver is passed through a fuser system. There have been several approaches to decrease the amount of toner offset onto fuser members. One approach has been to make the toner-contacting surface of a fuser member, for example, a fuser roller and/or pressure roller of a non-adhesive (non-stick) material.

One known non-adhesive coating for fuser members comprises fluoropolymer resins, but fluoropolymer resins are non-compliant. It is desirable to have compliant fuser members to increase the contact area between a fuser member and the toner-bearing receiver. However, fuser members with a single compliant rubber layer absorb release oils and degrade in a short time leading to wrinkling artifacts, non-uniform nip width and toner offset. To make fluoropolymer resin coated fuser members with a compliant layer, U.S. Pat. Nos. 3,435,500 and 4,789,565 disclose a fluoropolymer resin layer sintered to a silicone rubber layer which is adhered to a metal core. In U.S. Pat. No. 4,789,565, an aqueous solution of fluoropolymer resin powder is sintered to the silicone rubber layer. In U.S. Pat. No. 3,435,500, a fluoropolymer resin sleeve is sintered to the silicone rubber layer. Sintering of the fluoropolymer resin layer is usually accomplished by heating the coated fuser members to temperatures of approximately 500° C. Such high temperatures can have a detrimental effect on the silicone rubber layer causing the silicone rubber to smoke or depolymerize, which decreases the durability of the silicone rubbers and the adhesion strength between the silicone rubber layer and the fluoropolymer resin layer. Attempts to avoid the detrimental effect the high sintering temperatures have on the silicone rubber layer have been made by using dielectric heating of the fluoropolymer resin layer, for example see U.S. Pat. Nos. 5,011,401 and 5,153,660. Dielectric heating is, however, complicated and expensive and the fluoropolymer resin layer may still delaminate from the silicone rubber layer when the fuser members are used in high pressure fuser systems. In addition, a fuser member made with a fluoropolymer resin sleeve layer possesses poor abrasion resistance and poor heat resistance.

For the foregoing reasons, there is a need for fuser members and a method of fabricating fuser members which have a fluoropolymer resin layer, and compliant layer or layers, exhibiting improved adhesion between their constituent layers, improved abrasion resistance, improved heat resistance and the ability to be made more economically.

SUMMARY OF THE INVENTION

The fuser members of this invention comprise, in order, a support; a fluoroelastomer layer; and a fluoropolymer resin layer directly on said fluoroelastomer layer. Further, this invention includes the method of making the coated fuser members which comprises the steps of applying to a support a fluoroelastomer layer; applying to the fluoroelastomer layer a fluoropolymer resin powder; and sintering the fluoropolymer resin powder to form a fluoropolymer resin layer.

The fuser members of this invention have good non-adhesiveness to toner, abrasion resistance, heat resistance and adhesion between the layers. There is little or no deterioration of the layers or of the adhesion between the layers during the sintering step of the process, because the fluoroelastomer layer, and fluoropolymer resin layer have good heat resistance. Further, the fuser member and method of this invention do not use primers between the fluoroelastomer layer and the fluoropolymer resin powder layer which simplifies the method of making the fuser member, and surprisingly provides excellent adhesion between the fluoroelastomer layer and the fluoropolymer resin powder layer.

DESCRIPTION OF THE INVENTION

The fuser member of this invention comprises, in order, a support; a fluoroelastomer layer; and directly thereon a fluoropolymer resin layer. In preferred embodiments of the invention, the bonds between the fluoropolymer resin layers, and fluoroelastomer layers are very strong, making it very difficult to peel the layers apart.

The term "fuser member" is used herein to identify one of the elements of a fusing system. The fuser member can be a pressure or fuser plate, pressure or fuser roller, a fuser belt or any other member on which a release coating is desirable. Commonly, the fuser member is a fuser roller or pressure roller and the discussion herein may refer to a fuser roller or pressure roller, however, the invention is not limited to any particular configuration of fuser member.

The support for the fuser member can be a metal element with or without additional layers adhered to the metal element. The metal element can take the shape of a cylindrical core, plate or belt. The metal element can be made of, for example, aluminum, stainless steel or nickel. The surface of the metal element can be rough, but it is not necessary for the surface of the metal element to be rough to achieve good adhesion between the metal element and the layer attached to the metal element. The additional support layers adhered to the metal element comprise of one or more layers of materials useful for fuser members, such as, silicone rubbers, fluoroelastomers and primers.

In one preferred embodiment of the invention, the support comprises a metal element coated with an adhesion promoter layer. The adhesion promoter layer can be any commercially available material known to promote the adhesion between fluoroelastomers and metal, such as silane coupling agents, which can be either epoxy-functionalized or amine-functionalized, epoxy resins, benzoguanamineformaldehyde resin crosslinker, epoxy cresol novolac, dianilinosulfone crosslinker, polyphenylene sulfide polyether sulfone, polyamide, polyimide and polyamide-imide. Preferred adhesion promoters are epoxy-functionalized silane coupling agents. The most preferable adhesion promoter is a dispersion of THIXON 300, THIXON 311 and triphenylamine in methyl ethyl ketone. The THIXON materials are supplied by Morton Chemical Co.

In another preferred embodiment of the invention, the support consists of a metal element with one or more base cushion layers. The base cushion layer or layers can consist of known materials for fuser member layers such as one or more layers which may be the same or different of silicone rubbers, fluorosilicone rubbers, or any of the same materials that can be used to form fluoroelastomer layers. Preferred silicone rubber layers consist of polymethyl siloxanes, such as EC-4952, sold by Emerson Cummings or SILASTIC J or E sold by Dow Corning. Preferred fluorosilicone rubbers include polymethyltrifluoropropylsiloxanes, such as SYLON Fluorosilicone FX11293 and FX11299 sold by 3M.

The base cushion layer may be adhered to the metal element via a base cushion primer layer. The base cushion primer layer can comprise a primer composition which improves adhesion between the metal element and the material used for the base cushion layer. If the base cushion layer is a fluoroelastomer material, the adhesion promoters described above can be used as the base cushion primer layer. Other primers for the application of fluorosilicone rubbers and silicone rubbers to the metal element are known in the art. Such primer materials include silane coupling agents, which can be either epoxy-functionalized or amine-functionalized, epoxy resins, benzoguanamineformaldehyde resin crosslinker, epoxy cresol novolac, dianilinosulfone crosslinker, polyphenylene sulfide polyether sulfone, polyamide, polyimide and polyamide-imide.

The inclusion of a base cushion layer on the metal element of the support increases the compliancy of the fuser member. By varying the compliancy, optimum fuser members and fuser systems can be produced. The variations in the compliancy provided by optional base cushion layers are in addition to the variations provided by just changing the thickness or materials used to make the fluoroelastomer layer and/or fluoropolymer resin layer. The presently preferred embodiment in a fuser roller system is to have a very compliant fuser roller and a non-compliant or less compliant pressure roller. In a fuser belt system it is preferred to have a compliant pressure roller and a non-compliant or less compliant belt. Although the above are the presently preferred embodiments, fuser systems and members including plates, belts and rollers can be made in various configurations and embodiments wherein at least one fuser member is made according to this invention.

The fluoroelastomer layer can comprise copolymers of vinylidene fluoride and hexafluoropropylene, copolymers of tetrafluoroethylene and propylene, terpolymers of vinylidene fluoride, hexafluoropropylene and tetrafluoroethylene, terpolymers of vinylidene fluoride, tetrafluoroethylene and perfluoromethylvinylethyl, and terpolymers of vinylidene fluoride, tetrafluoroethylene, and perfluoromethylvinylether. Specific examples of fluoroelastomers which are useful in this invention are commercially available from E. I. DuPont de Nemours and Company under the trade names KALREZ, and VITON A, B, G, GF and GLT, and from 3M Corp. under the trade names FLUOREL FC 2174, 2176 and FX 2530 and AFLAS. Additional vinylidene fluoride based polymers useful in the fluoroelastomer layer are disclosed in U.S. Pat. No. 3,035,950, the disclosure of which is incorporated herein by reference. Mixtures of the foregoing fluoroelastomers may also be suitable. Although it is not critical in the practice of this invention, the number-average molecular weight range of the fluoroelastomers may vary from a low of about 10,000 to a high of about 200,000. In the preferred embodiments, vinylidene fluoride-based fluoroelastomers have a number-average molecular weight range of about 50,000 to about 100,000.

A preferable material for the fluoroelastomer layer is a compounded mixture of a fluoroelastomer polymer, a curing material, and optional fillers. The curing material can consist of curing agents, crosslinking agents, curing accelerators and fillers or mixtures of the above. Suitable curing agents for use in the process of the invention include the nucleophilic addition curing agents as disclosed, for example, in the patent to Seanor, U.S. Pat. No. 4,272,179, incorporated herein by reference. Exemplary of a nucleophilic addition cure system is one comprising a bisphenol crosslinking agent and an organophosphonium salt as accelerator. Suitable bisphenols include 2,2-bis(4-hydroxyphenyl) hexafluoropropane, 4,4-isopropylidenediphenol and the like. Although other conventional cure or crosslinking systems may be used to cure the fluoroelastomers useful in the present invention, for example, free radical initiators, such as an organic peroxide, for example, dicumylperoxide and dichlorobenzoyl peroxide, or 2,5-dimethyl-2,5-di-t-butylperoxyhexane with triallyl cyanurate, the nucleophilic addition system is preferred. Suitable curing accelerators for the bisphenol curing method include organophosphonium salts, e.g., halides such as benzyl triphenylphosphonium chloride, as disclosed in U.S. Pat. No. 4,272,179 cited above.

The fluoroelastomer can include inert filler. Inert fillers are frequently added to polymeric compositions to provide added strength and abrasion resistance to a surface layer. In the fluoroelastomer layer of the fuser member of this invention, inclusion of the inert filler is optional. Omission of the inert filler does not reduce the adhesive strength of the fluoroelastomer layer. Suitable inert fillers which are optionally used include mineral oxides, such as alumina, silica, titania, and carbon of various grades.

Nucleophilic addition-cure systems used in conjunction with fluoroelastomers can generate hydrogen fluoride and thus acid acceptors may be added as fillers. Suitable acid acceptors include Lewis acids such as lead oxide, magnesium oxide, such as MAGLITE D and Y supplied by Merck & Co., calcium hydroxide, such as C-97, supplied by Fisher Scientific Co., zinc oxide, copper oxide, tin oxide, iron oxide and aluminum oxide which can be used alone or as mixtures with the aforementioned inert fillers in various proportions. The most preferable fluoroelastomer layer material comprises a compounded mixture of 100 parts VITON A, from 2 to 9 parts 2,2-bis(4-hydroxyphenyl) hexafluoropropane, commercially available as CURE 20, from 2 to 10 parts benzyl triphenylphosphonium chloride, commercially available as CURE 30, from 5 to 30 parts lead oxide and from 0 to 30 parts THERMAX (carbon black), mechanically compounded at room temperature on a two roll mill until it forms a uniform mixture. CURE 20 and CURE 30 are products of DuPont Co. THERMAX is a product of R.T. Vanderbilt Co., Inc. This compounded mixture can either be compression molded onto the support, or dispersed in solvent for dip-, ring- or spray-coating onto the support. If ring-coating is used to apply this compounded mixture to the support, then it is preferable to add a small amount of aminosiloxane polymer to the formulation described above. For additional information on this fluoroelastomer composite material, see U.S. Pat. No. 4,853,737, which is incorporated herein by reference.

The fluoroelastomer layer can also comprise an interpenetrating network of fluoroelastomer and a silicone polymer. An interpenetrating network coating composition can be obtained by mechanically compounding fluoroelastomer polymer, functionalized siloxane, fluorocarbon curing materials and optional acid acceptors or other fillers to form a uniform mixture suitable for compression molding or dip-, ring-, or spray-coating after dispersing the composite in a solvent. The fluoroelastomer polymers, curing materials, curing agents, curing accelerators, acid acceptors and other fillers can be selected from those previously described above. The finctionalized siloxane is preferably a polyfunctional poly($C_{1-6}$ alkyl)phenyl siloxane or polyfunctional poly($C_{1-6}$ alkyl)siloxane. Preferred siloxanes are heat-curable, however peroxide-curable siloxanes can also be used with conventional initiators. Heat curable siloxanes include the hydroxy-functionalized organopolysiloxanes belonging to the classes of silicones known as "hard" and "soft" silicones. Preferred hard and soft silicones are silanol-terminated polyfinctional organopolysiloxanes.

Exemplary hard and soft silicones are commercially available or can be prepared by conventional methods. Examples of commercially available silicones include DC6-2230 silicone and DC-806A silicone (sold by Dow Coming Corp.), which are hard silicone polymers, and SFR-100 silicone (sold by General Electric Co.) and EC-4952 silicone (sold by Emerson Cummings Co.), which are soft silicone polymers. DC6-2230 silicone is characterized as a silanol-terminated polymethyl-phenylsiloxane copolymer containing phenyl to methyl groups in a ratio of about 1 to 1, difunctional to trifunctional siloxane units in a ratio of about 0.1 to 1 and having a number-average molecular weight between 2,000 and 4,000. DC-806A silicone is characterized as a silanol-terminated polymethylphenylsiloxane copolymer containing phenyl to methyl groups in a ratio of about 1 to 1 and having difunctional to trifunctional siloxane units in a ratio of about 0.5 to 1. SFR-100 silicone is characterized as a silanol- or trimethylsilyl-terminated polymethylsiloxane and is a liquid blend comprising about 60 to 80 weight percent of a difunctional polydimethylsiloxane having a number-average molecular weight of about 90,000 and 20 to 40 weight percent of a polymethylsilyl silicate resin having monofunctional (i.e. $SiO_2$) repeating units in an average ratio of between about 0.8 and 1 to 1, and having a number-average molecular weight of about 2,500. EC-4952 silicone is characterized as a silanol-terminated polymethylsiloxane having about 85 mole percent of difunctional dimethylsiloxane repeating units, about 15 mole percent of trifunctional methylsiloxane repeating units and having a number-average molecular weight of about 21,000.

Preferred fluoroelastomer-silicone interpenetrating networks have ratios of silicone to fluoroelastomer polymer between about 0.1 and 1 to 1 by weight, preferably between about 0.2 and 0.7 to 1. The interpenetrating network is preferably obtained by mechanically compounding, for example, on a two-roll mill a mixture comprising from about 40 to 70 weight percent of a fluoroelastomer polymer, from 10 to 30 weight percent of a curable polyfunctional poly ($C_{1-6}$ alkyl)phenylsiloxane or poly($C_{1-6}$ alkyl)siloxane polymer, from 1 to 10 weight percent of a curing agent, from 1 to 3 weight percent of a curing accelerator, from 5 to 30 weight percent of an acid acceptor type filler, and from 0 to 30 weight percent of an inert filler.

When a fluoroelastomer-silicone interpenetrating network is the fluoroelastomer layer material, the support is coated by conventional techniques, usually by compression molding or spray-, ring-, or dip-coating. The solvents used for solvent coating include polar solvents, for example, ketones, acetates and the like. Preferred solvents for the fluoroelastomer based interpenetrating networks are the ketones, especially methyl ethyl ketone and methyl isobutyl ketone. The dispersions of the interpenetrating networks in the coating solvent are at concentrations usually between about 10 to 50 weight percent solids, preferably between about 20 to 30 weight percent solids. The dispersions are coated on the support to give a 10 to 100 micrometer thick sheet when cured.

Curing of the interpenetrating network is carried out according to the well known conditions for curing fluoroelastomer polymers ranging, for example, from about 12 to 48 hours at temperatures of between 50° C. to 250° C. Preferably, the coated composition is dried until solvent free at room temperature, then gradually heated to about 230° C. over 24 hours, then maintained at that temperature for 24 hours.

Additional information on fluoroelastomer-silicone polymer interpenetrating networks can be found in U.S. Pat. No. 5,582,917 filed Sep. 16, 1993, which is a continuation of U.S. application Ser. No. 940,929, filed Sep. 4, 1992. These three patent applications are assigned to the Eastman Kodak Co., and are incorporated herein by reference.

The fluoropolymer resin layer comprises a sintered fluoropolymer resin powder, such as semicrystalline fluoropolymer or a semicrystalline fluoropolymer composite. Such fluoropolymer resin powder materials include polytetrafluoroethylene (PTFE) powder, polyperfluoroalkoxy (PFA) powder, polyfluorinated ethylene-propylene (FEP) powder, poly(ethylenetetrafluoroethylene) powder, polyvinylfluoride powder, polyvinylidene fluoride powder, poly(ethylene-chloro-trifluoroethylene) powder, polychlorotrifluoroethylene powder, and mixtures and copolymers of fluoropolymer resin powders. Some of these fluoropolymer resin powders are commercially available from DuPont as TEFLON or SILVERSTONE materials, and from Whitford as DYKOR materials.

The fluoropolymer resin powders are dry, solventless, solid particles. The fluoropolymer resin powders can be prepared by mechanically grinding a fluoropolymer resin to form the powder. Methods for forming fluoropolymer resin powders have been previously disclosed in the prior art. For example, PTFE powder can be prepared by polymerizing tetrafluoroethylene in an aqueous medium with an initiator and emulsifying agent, the PTFE is separated from the aqueous medium and dried, and then mechanically ground to produce fine particulate. For additional description on making fluoropolymer resin powders, see U.S. Pat. No. 2,612,484, and *Encyclopedia of Polymer Science and Engineering*, Vol. 16, 2nd Ed., pp 577–599 (John Wiley & Sons 1989) incorporated herein by reference.

The preferred fluoropolymer resin powders used to make the fluoropolymer resin layer are PFA and FEP. The preferred PFA is commercially available from Whitford as DYKOR 810 and from DuPont as PFA-532-5011. The preferred FEP is available from DuPont as FEP-532-8000. The particle size of the fluoropolymer resin powders are preferably from 10 microns to 60 microns, more preferably from 15 microns to 50 microns, most preferably from from 20 microns to 40 microns.

The fluoropolymer resin powder is preferably applied to the fluoroelastomer layer by a dry, that is a solventless, application method. Examples of solventless application methods include molding, and electrostatic powder spray coating. The preferred method is electrostatic powder spray coating, which preferably is accomplished by dispersing the fluoropolymer resin powder in a gas stream, passing the powder through a high voltage field in order to apply an electrostatic charge to the powder, grounding the support having the fluoroelastomer layer and spraying the charged powder at the fluoroelastomer layer thereby causing the charged powder to electrostatically adhere to the fluoroelastomer layer. Preferably, the resulting fuser member comprising the support, fluoroelastomer layer and electrostatically adhered fluoropolymer resin powder layer is then placed into an oven at a temperature and time sufficient to sinter the fluoropolymer resin powder to the fluoroelastomer layer. Typically, fluoropolymer resin powders are sintered at 270° C. to 350° C. for 10 minutes to 1 hour.

Electrostatic spray systems useful for this method are available from Nordson Corp and other suppliers. Additional information on electrostatic powder spray coating is available in the prior art, for example, see *Encyclopedia of Chemical Technology*, Vol. 19, pp 1–25 (John Wiley & Sons 1982), incorporated herein by reference.

The surface roughness of the fluoropolymer resin powder layer is preferably from 0.25 to 2.5 microns (10 to 100 microinch), more preferably from 0.5 to 2 microns (20 to 80 microinch) and most preferably from 1 to 1.75 microns (40 to 70 microinch). The surface roughness can be measured using a Federal Surface Analyzer, System 4000, having a sapphire chisel stylus with a radius of 10 $\mu$m. The preferred fuser members made by the preferred methods of this invention typically have a greater surface roughness than fuser members made by heat-shrinking fluoropolymer sleeves or by other methods of applying fluoropolymer resins to fuser members.

The thicknesses of the layers of the fuser members of this invention can vary depending on the desired compliancy or noncompliancy of a fuser member. The preferred thicknesses of the layers for a fuser member having a base cushion layer as part of the support are as follows: the base cushion primer layer may be from 2.5 to 25 microns (0.1 to 1 mils); the base cushion layer may be from 25 microns to 10 mm (1 to 400 mils), the fluoroelastomer layer may be from 25 microns to 10 mm (1 to 400 mils); and the fluoropolymer resin layer may be from 25 to 75 microns (1 to 3 mils). The preferable thicknesses for the layers of a fuser member with no base cushion layer as part of the support are as follows: the adhesion promoter may be from 7.5 to 25 microns (0.3 to 1 mils); the fluoroelastomer layer may be from 25 micons to 10 mm (1 to 400 mils); and the fluoropolymer resin layer may be from 25 to 75 microns (1.0 to 3 mils). In both embodiments, more preferably the fluoropolymer resin layer has a thickness from 25 to 50 micons (1 to 2 mils).

The compositions of the above-described layers of the fuser member may optionally contain additives or fillers such as aluminum oxide, iron oxide, magnesium oxide, silicon dioxide, titanium dioxide, calcium hydroxide, lead oxide, zinc oxide, copper oxide and tin oxide to increase the thermal conductivity or the hardness of the layers. Pigments may be added to affect the color. Optional adhesive materials and dispersants may also be added.

The coated fuser member of this invention having a support can be made by the following steps: applying to the support a fluoroelastomer layer; coating the fluoroelastomer layer with a powder fluoropolymer resin layer; and sintering the fluoropolymer resin layer.

In one embodiment of the invention, the support consists of a metal element and an adhesion promoter for a fluoroelastomer layer. In another embodiment of the invention the support consists of a primer layer and one or more base cushion layers with additional primer layers between the base cushion layers where necessary. The methods of making some of the embodiments of this invention will be described in more detail.

The fuser member without a base cushion layer can be prepared as follows:

Firstly, the support is prepared. A metal element is cleaned and dried. Any commercial cleaner or known solvent, for example isopropyl alcohol, which will remove grease, oil and dust can be used for this purpose. The support is further prepared by applying to the metal element the adhesion promoter layer. The adhesion promoter may be applied to the metal element by any method which provides a uniform coating. Examples of such methods include wiping, brushing, or spray-, ring- or dip-coating the material onto the metal support. The adhesion promoter is dried and cured typically in an oven at temperatures between about 160 and 176° C. (320° F. and 350° F.). Secondly, the fluoroelastomer layer is applied to the primer layer usually by compression-molding, extrusion-molding, or blade-, spray-, ring- or dip-coating the fluoroelastomer layer onto the support. The fluoroelastomer layer is then cured typically in an oven at temperatures between about 198 and 260° C. (390° F. and 500° F.). Thirdly, the fluoropolymer resin powder layer is applied to the fluoroelastomer layer. Preferably, the fluoropolymer resin powder layer is applied by electrostatic powder spray-coating. Fourthly, the fuser member is placed in an oven typically at temperatures between about 316 and 427° C. (600° F. and 800° F.) to sinter the fluoropolymer resin layer. (The specified temperature ranges can vary depending upon the material to be cured and the curing time.)

Other embodiments of the invention have a base cushion layer as part of the support. For example, to make a coated fuser member with a support consisting of a metal element, silicone rubber primer layer, and a condensation cure silicone rubber layer, and then the fluoroelastomer layer, and fluoropolymer resin powder layer, the method is as follows: Firstly, the metal element is cleaned and dried as described earlier. Secondly, the metal element is coated with a layer of a known silicone rubber primer, selected from those described earlier. A preferred primer for a condensation cure silicone rubber base cushion layer is GE 4044 supplied by General Electric. Thirdly, the silicone rubber layer is applied by an appropriate method, such as blade-coating, ring-coating, injection-molding or compression-molding the silicone rubber layer onto the silicone rubber primer layer. A preferred condensation cure polydimethyl siloxane is EC-4952 produced by Emerson Cummings. Fourthly, the silicone rubber layer is cured, usually by heating it to temperatures typically between 210 and 232° C. (410° F. and 450° F.) in an oven. Fifthly, the silicone rubber layer undergoes corona discharge treatment usually at about 750 watts for 90 to 180 seconds. From here the process of applying and curing the fluoroelastomer layer, and fluoropolymer resin powder layer described above is followed.

In yet other embodiments of the invention with a base cushion layer as part of the support, the process is modified as follows. If the base cushion layer is an addition cure silicone rubber, the preferred silicone primer DC-1200 supplied by Dow Coming is applied to the metal element. Then, the addition cure silicone rubber is applied, for example, by injection-molding. The silicone rubber layer is then cured. If the base cushion layer is a fluorosilicone elastomer, the metal element is primed with a known silicone primer, then the fluorosilicone elastomer layer is applied, usually by compression-molding and cured. If a fluoroelastomer-silicone interpenetrating network or other additional fluoroelastomer material is used as the base cushion layer or layers, an adhesion promoter appropriate for a fluoroelastomer layer is applied to the metal element, the fluoroelastomer base cushion layer is applied to the base cushion primer layer and cured. If the base cushion layer is a fluoroelastomer material it is not necessary to cure, prime or to corona discharge treat the base cushion fluoroelastomer layer before application of the fluoroelastomer layer to it.

There are optional sandblasting, grinding and polishing steps. As stated earlier, it is not necessary to sandblast the metal element, because it is not required for good adhesion between the metal element and the adjacent layer. However, the fluoroelastomer layer and additional base cushion layer or layers, if any, may be ground during the process of making the fuser members. These layers may be mechanically ground to provide a smooth coating of uniform thickness which sometimes may not be the result when these layers are applied to the support, especially by the processes of compression-molding or blade-coating.

Any kind of known heating method can be used to cure or sinter the layers onto the fuser member, such as convection heating, forced air heating, infrared heating, and dielectric heating.

The fuser members produced in accordance with the present invention are useful in electrophotographic copying machines to fuse heatsoftenable toner to a substrate. This can be accomplished by contacting a receiver, such as a sheet of paper, to which toner particles are electrostatically attracted in an imagewise fashion, with such a fuser member. Such contact is maintained at a temperature and pressure sufficient to fuse the toner to the receiver. Because these members are so durable they can be cleaned using a blade, pad, roller or brush during use. And, although it may not be necessary because of the excellent release properties of the fluoropolymer resin powder layer, release oils may be applied to the fuser member without any detriment to the fuser member.

The following examples illustrate the preparation of the fuser members of this invention.

EXAMPLE 1

A coated roller consisting of a aluminum core, a base cushion primer layer and a silicone rubber base cushion layer as the support, and a fluoroelastomer layer, and an PFA fluoropolymer resin powder top layer was prepared.

A 5.5 mm (0.220 inch) thick aluminum cylindrical core with a 48 mm (1.93 inch) diameter and 425 mm (16.75 inch) length was blasted with glass beads and cleaned and dried with dichloromethane and wiped with S11 primer available from Emerson Cumming. Over the primer layer a red rubber silicone, EC5877 available from Emerson Cumming was coated and cured for 24 hours at room temperature. After curing, the red rubber was mechanically ground to 20 mils. The fluoroelastomer coating was prepared by compounding 100 parts of VITON A, 3 parts CURE 20,6 parts CURE 30, 20 parts THERMAX and 15 parts lead oxide in a two roll mill for about 30 to 45 minutes until a uniform composite was produced. Approximately 610 grams of the fluoroelastomer composite were prepared. The fluoroelastomer material was diluted to a 25% solid solution in a 1:1 methyl ethyl ketone and methyl isobutyl ketone solvent and ring-coated onto the EC5877. The roller was air dried for 16 hours and post-cured for 24 hours ramp to 232° C. and 24 hours at 232° C. The fluoroelastomer layer had a thickness of 1 mil. The fluoropolymer resin powder DYKOR 810 fine PFA available from Whitford was electrostatically spray coated onto the fluoroelastomer layer, and then the fuser member was cured for 10 minutes at 400° C. in a convection oven.

The roller had excellent adhesion between the layers. The roller was tested. The surface energy of the roller was determined by contact angle measurements using a Rame-Hart Inc., NRL model A-100 contact angle Goniometer. The low surface energy indicates that the PFA powder coating is present on the surface of the Viton A. Wear properties were measured using a Norman Abrader test device that ran a strip of paper against a fuser roller material to simulate the wearing of a fuser roller in an electrostatographic machine. Testing was performed for 1600 cycles at 175° C. Surface Roughness (Ra) was measured by using a Federal Surface Analyzer having a sapphire chisel stylus.

A life test of the roller was performed by putting the roller into an EK-95 electrophotographic machine available from Eastman Kodak Co. The roller was used as a fuser roller against the pressure roller in the EK-95 machine to produce 145,000 copies using 20 lb paper in the duplex mode. The test was stopped without any failure or delamination of the roller. The results of these tests are in Table 1.

TABLE 1

| Results for Example 1 | |
|---|---|
| Surface Energy | 19.87 dyne/cm$^2$ |
| Wear | 1.3 mil |
| Surface Roughness | 1.6 micons (64 $\mu$in.) |
| Life Test | 145,000+ copies |

Comparative Example 1

A coated roller consisting of, in order, a support, a fluoroelastomer layer, a polyamide-imide-PTFE mixture primer layer and a blend of PTFE and PFA fluoropolymer resin layer was prepared.

A 0.220 inch aluminum cylindrical core with a 80.5 mm (3.17 inch) diameter and 422 mm (16.6 inch) length that was blasted with glass beads and cleaned and dried with dichloromethane was uniformly spray-coated with an adhesion promoter to a uniform thickness of from 0.5 to 1 mil. The adhesion promoter consisted of I gram of THIXON 300, 1 gram of THIXON 311 and 2 grams of a mixture of 0.5 grams triphenylamine in 40 grams of methyl ethyl ketone. The adhesion promoter was air dried for 15 minutes and placed in a convection oven at 176° C. (350° F.) for 10 minutes. The fluoroelastomer coating was prepared by compounding 100 parts of VITON A, 3 parts CURE 20, 6 parts CURE 30, 20 parts THERMAX and 15 parts lead oxide in a two roll mill for about 30 to 45 minutes until a uniform composite was produced. Approximately 610 grams of the fluoroelastomer composite were compression molded onto the adhesion promoter layer on the core and cured at 325° F. for 2 hours under 75 tons/in$^2$ pressure. The mold was opened and closed a few times initially to squeeze entrapped air out of the fluoroelastomer material. The roller was removed from the mold, and placed in a convection oven for post-curing. The conditions for the post-cure were a 24 hour ramp to 232° C. and 24 hours at 232° C. The fluoroelastomer layer was ground to 40 mils in thickness. A uniform layer of primer about 0.3 mils thick was spray-coated onto the fluoroelastomer layer. The primer was SILVERSTONE 855-021 from DuPont. The primer consisted of an aqueous dispersion of polyamic acid and PTFE. The primer was air dried. A layer of SUPRA SILVERSTONE 855-500, a blend of PTFE and PFA fluoropolymer resins in an aqueous dispersion, was spray-coated onto the primer layer to about 1.0 mil thickness. The fuser member was then placed in a convection oven at 371° C. (700° F.) for approximately 10 minutes to sinter the SUPRA SILVERSTONE.

The roller of Comparative Example 1 had excellent adhesion between the layers; however, a primer was present between the fluoroelastomer layer and the fluoropolymer resin layer. The two steps of applying the primer and drying the primer described in Comparative Example 1 are steps which are not present in the method of this invention. The absence of these steps provides for simplified manufacturing of the fuser members of this invention.

The invention has been described in detail with particular reference to preferred embodiments thereof, but it will be understood that variations and modifications can be effected within the spirit and scope of the invention.

What is claim is:

1. A method of making a coated fuser member having a support, without the use of primers between a fluoroelastomer layer and a fluoropolymer resin layer, comprising the steps of:

applying to said support a fluoroelastomer layer;

applying directly to said fluoroelastomer layer a layer of solventless fluoropolymer resin powder; and sintering the fluoropolymer resin powder to the fluoroelastomer resin layer on said support.

2. The method of claim 1, wherein the surface roughness of said layer of solventless fluoropolymer resin powder after sintering is from 0.25 to 2.5 microns.

3. The method of claim 1 wherein said fluoropolymer resin powder has a particle size of from 10 to 60 microns.

4. The method of claim 1 wherein said fluoropolymer resin powder has a particle size of from 15 to 50 microns.

5. The method of claim 1 wherein said applying directly to said fluoroelastomer layer step is accomplished by molding said solventless fluoropolymer resin powder onto said fluoroelastomer layer.

6. The method of claim 1 wherein said applying directly to said fluoroelastomer layer step is accomplished by electronic powder spray coating said solventless fluoropolymer resin powder onto said fluoroelastomer layer.

7. The method of claim 6 wherein said electrostatic powder spray coating said fluoropolymer resin powder onto said fluoroelastomer layer comprises the following steps:

dispersing said fluoropolymer resin powder in a gas stream;

passing said fluoropolymer resin powder through a voltage field sufficient to apply an electrostatic charge to said fluoropolymer resin powder;

grounding said support;

and spraying said fluoropolymer resin powder at said fluoroelastomer layer, to electrostatically adhere said solventless fluoropolymer resin powder to said fluoroelastomer layer.

8. The method of claim 1, wherein said fluoroelastomer layer is prepared by compounding a mixture comprising fluoroelastomer polymer, curing agent, curing accelerator, and acid acceptor, and wherein the step of applying said fluoroelastomer layer to said support is accomplished by compression molding.

9. The method of claim 1, wherein said support is prepared by the steps comprising:

coating a metal element with a silicone primer layer;

applying a silicone rubber layer to said silicone primer layer; and curing said silicone rubber layer.

* * * * *